Figure 1:
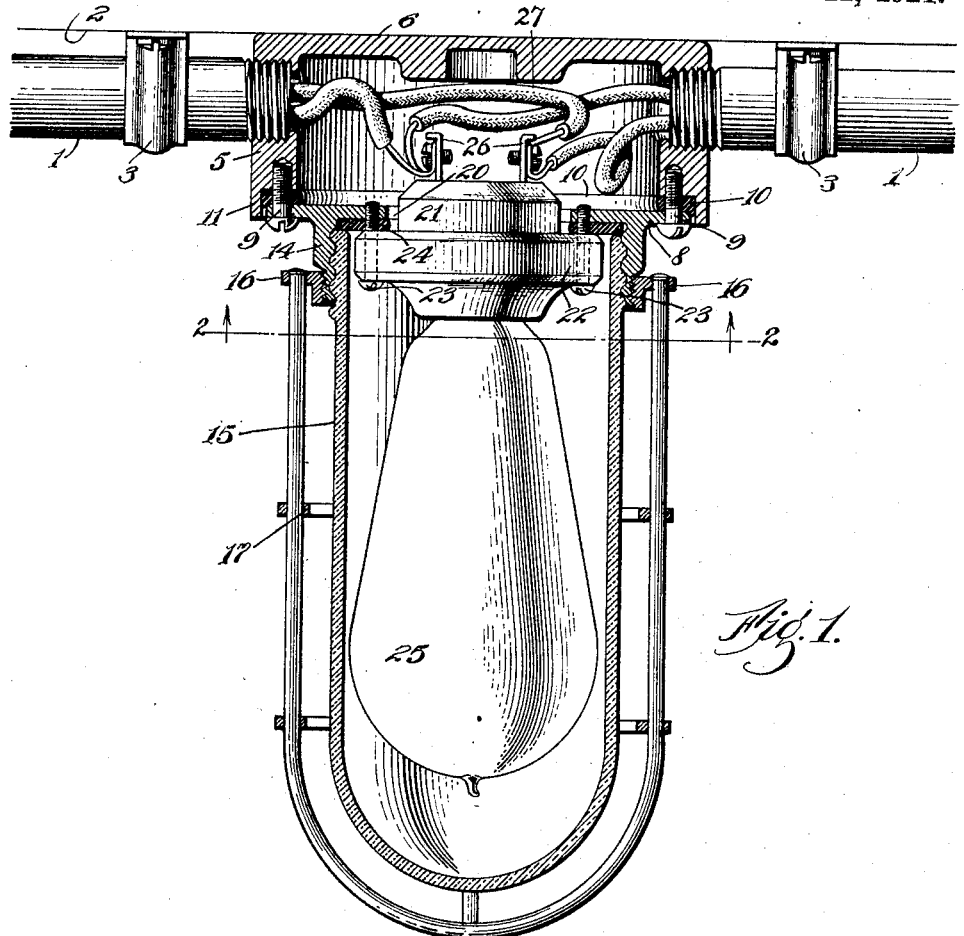

J. C. BOYTON AND O. H. NICKERSON.
ELECTRIC LIGHT FITTING.
APPLICATION FILED NOV. 11, 1918.

1,393,075.

Patented Oct. 11, 1921.

Inventors,
John C. Boyton and
Oris H. Nickerson.
By Hull, Smith, Brock & West
Attys.

UNITED STATES PATENT OFFICE.

JOHN C. BOYTON AND ORIS H. NICKERSON, OF CLEVELAND, OHIO, ASSIGNORS TO THE ADAPTI COMPANY, OF CLEVELAND, OHIO, A CORPORATION OF OHIO.

ELECTRIC-LIGHT FITTING.

1,393,075.  Specification of Letters Patent.  Patented Oct. 11, 1921.

Application filed November 11, 1918. Serial No. 262,026.

*To all whom it may concern:*

Be it known that we, (1) JOHN C. BOYTON, (2) ORIS H. NICKERSON, citizens of the United States, residing at Cleveland, in the county of Cuyahoga and State of Ohio, have invented a certain new and useful Improvement in Electric-Light Fittings, of which the following is a full, clear, and exact description, reference being had to the accompanying drawings.

This invention relates to electrical fixtures or fittings especially designed for marine use; for use in acid plants; powder works; or under any and all similar circumstances.

The aim is to provide an electrical fixture or fitting comprising a thoroughly closed or leak-proof receptacle having connection with conduits through which electrical conductors are led into receptacles, and to support from the receptacle a suitable electrical element, such as an electric lamp, having connection with the electrical conductors inside the receptacle, it being the primary purpose of the invention to effectually seal the receptacle so that under no circumstances will moisture, vapor, dust, powder or the like be admitted to the receptacle where they might have deteriorating or corrosive effect upon the electrical connections therewithin, or be deposited there to cause short circuits, with resultant explosions in the case of powder. Also to conveniently support from the receptacle a suitable globe thoroughly inclosing the electric lamp, and a guard for protecting the globe or lamp from breakage.

A general object of the invention may be expressed as the provision of a simple construction through which the foregoing ends are effectually attained; and the invention may be defined as consisting of the combinations of elements set forth in the claims annexed hereto and illustrated in the accompanying drawing wherein similar reference characters designate corresponding parts in the two views.

Figure 2:
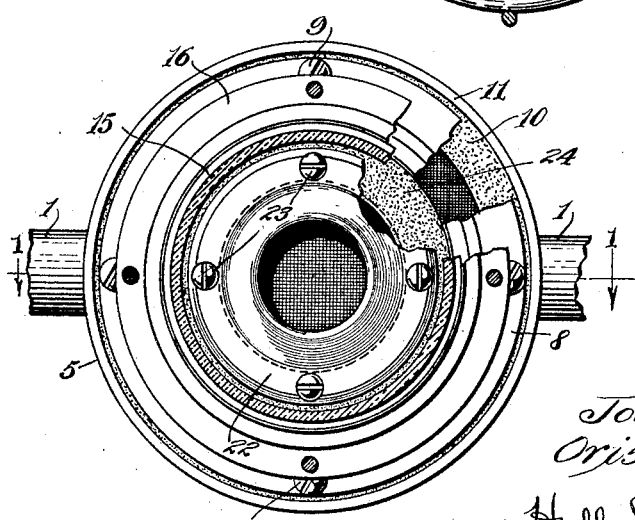

Figure 1 is a central vertical section of an electric light fitting embodying our invention; and Fig. 2 is a section on the line 2—2 of Fig. 1, looking in the direction of the arrows.

1, 1 are sections of an electric light wire conduit attached to a ceiling or other supporting surface 2 by clips 3, and having their adjacent ends threaded into opposed apertures of an outlet box 5. This box, in its present form, comprises a cylindrical wall through which the ends of the conduit sections are threaded, and a circular wall 6 closing one side of the box, the opposite side being open. A supporting plate or element 8 is attached, by means of screws 9, to the open side of the box, with a gasket 10 of suitable packing material interposed between its edge and the wall of the box, the wall having a peripheral flange 11 which confines the gasket against radial displacement upon a firm setting down of the screws 9. This affords a very effectual and durable seal between the box and the supporting plate or element. An angular flange 14 is incorporated in the supporting plate or element and is placed inward a suitable distance from its edge, the same being threaded on its inner side for the reception of the threaded end of a glass globe 15, and on its outer side for the application of the base ring 16 of a suitable guard 17, similar to those employed on marine vessels for protecting electric lamps. The supporting element has a central aperture 20 that is occupied by the inner end of a lamp socket 21, the socket having a flange 22 through apertures of which screws 23 are inserted to be threaded into the supporting plate or element adjacent the aperture 20, there being a washer 24 of packing material inserted between the flange and element. This washer is held against radial displacement by the flange 14 and adjacent thereto may be engaged by the inner end of the globe 15.

From this description it will be seen that so long as the globe 15 is unbroken, no moisture, vapor or other foreign substance may enter the globe; and in the event of the globe, or the globe and lamp 25, being broken, the box 5 is still effectually sealed by the washer 24, it being understood that the nature of the socket 21 affords no passage to fluids, dust or the like into the box, should the lamp be broken or removed.

26 represents the terminals of the socket 21 to which electric light wires 27 are shown as attached.

Having thus described our invention, what we claim is:—

1. In combination, a receptacle having an open side, and a self-contained unit applied to and closing the open side of the receptacle and comprising a supporting element, a lamp socket applied to the supporting element, the supporting element having a flange surrounding the lamp socket, and a guard sustained by the flange.

2. In combination, a receptacle having an open side, and a self-contained unit applied to and closing the open side of the receptacle and comprising a supporting element, a lamp socket applied to the supporting element, the supporting element having an internally and externally threaded flange surrounding the lamp socket, a globe having a threaded portion coöperating with the internal threads of the flange, and a guard having a threaded portion coöperating with the external threads of the flange.

3. In combination, a receptacle having an open side, and an element separably connected to the open side of the receptacle and arranged to support an electric lamp socket, lamp, and protecting globe so that all of said parts may be removed as a unit from the receptacle thereby to afford access to the interior of the receptacle.

4. In combination, a receptacle having an open side, and an element separably connected to the open side of the receptacle and arranged to support an electric lamp socket, lamp, protecting globe, and guard so that all of said parts may be removed as a unit from the receptacle thereby to afford access to the interior of the receptacle.

In testimony whereof, we hereunto affix our signatures.

JOHN C. BOYTON.
ORIS H. NICKERSON.